United States Patent [19]
Dimmer et al.

[11] Patent Number: 5,050,728
[45] Date of Patent: Sep. 24, 1991

[54] SWATHER BELT CONNECTOR

[75] Inventors: Jerry R. Dimmer; Antonin Pelc, both of Wahpeton, N. Dak.

[73] Assignee: Wahpeton Canvas Co., Inc., Wahpeton, N. Dak.

[21] Appl. No.: 451,568

[22] Filed: Feb. 5, 1990

[51] Int. Cl.$^5$ ............................................. B65G 15/30
[52] U.S. Cl. .................................. 198/844.2; 24/37; 24/31 F; 24/33 L; 411/401; 411/427
[58] Field of Search .............................. 198/844.2, 846; 474/253, 255, 256; 24/31 R, 31 L, 31 F, 33 L, 37, 38; 411/401, 427

[56] References Cited

U.S. PATENT DOCUMENTS

| | | | |
|---|---|---|---|
| 364,673 | 6/1887 | Ritz | 24/37 |
| 377,129 | 1/1888 | Weitzman | 24/37 |
| 384,434 | 6/1888 | Elmblad | 24/37 |
| 934,321 | 9/1909 | Kidwell | 24/31 F |
| 3,147,850 | 9/1964 | Ronceray | 198/846 X |
| 3,438,063 | 4/1969 | Loston | 24/31 L X |
| 4,540,389 | 9/1985 | Ramsey | 24/37 X |

FOREIGN PATENT DOCUMENTS

| | | | |
|---|---|---|---|
| 0005871 | 1/1906 | France | 24/31 F |
| 0008788 | 6/1908 | France | 24/37 |
| 002729 | 7/1878 | United Kingdom | 24/37 |
| 0016856 | of 1887 | United Kingdom | 24/37 |
| 0019913 | of 1889 | United Kingdom | 24/37 |
| 0012735 | of 1910 | United Kingdom | 24/31 F |

Primary Examiner—Robert P. Olszewski
Assistant Examiner—James R. Bidwell
Attorney, Agent, or Firm—Jones, Day, Reavis & Pogue

[57] ABSTRACT

A swather belt connector comprising an integral stud having substantially rectangular head with length approximately three times its width and threaded male portion protruding perpendicularly to the head and a substantially rectangular integral nut having length approximately three times its width and a threaded aperature proportioned to receive the protruding male portion, the aperture extending perpendicular to the length of the nut. The ends of a swather belt are connected by (1) positioning the belt ends with inside surface of one end against the inside surface of the other end, the aperatures of one end of the belt aligned with the aperatures on the other end, (2) inserting studs through the aligned aperatures, the studs each having elongated head with length approximately three times its width and threaded male portion protruding perpendicularly to the head, (3) mating a nut with each male portion of the studs, the nut having length approximately three times its width and a threaded aperature proportion to receive the protruding male portion, and (4) aligning the lengthwise dimension of the nut and the stud parallel to the widthwise dimension of the belt.

11 Claims, 2 Drawing Sheets

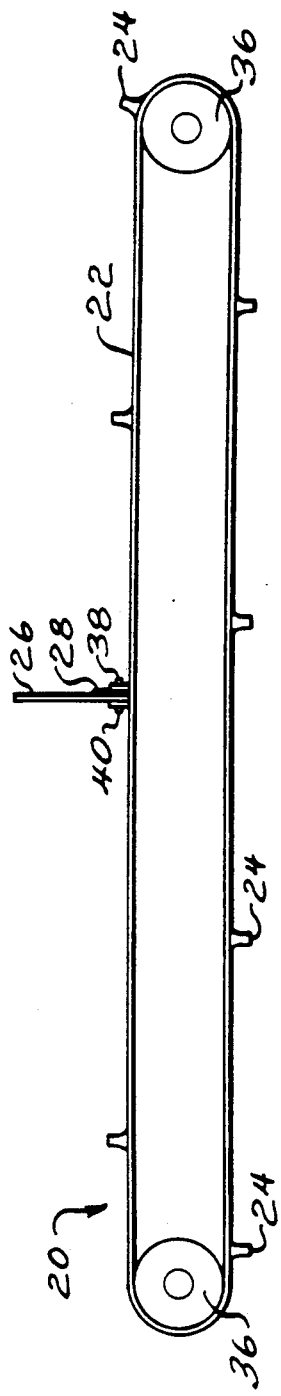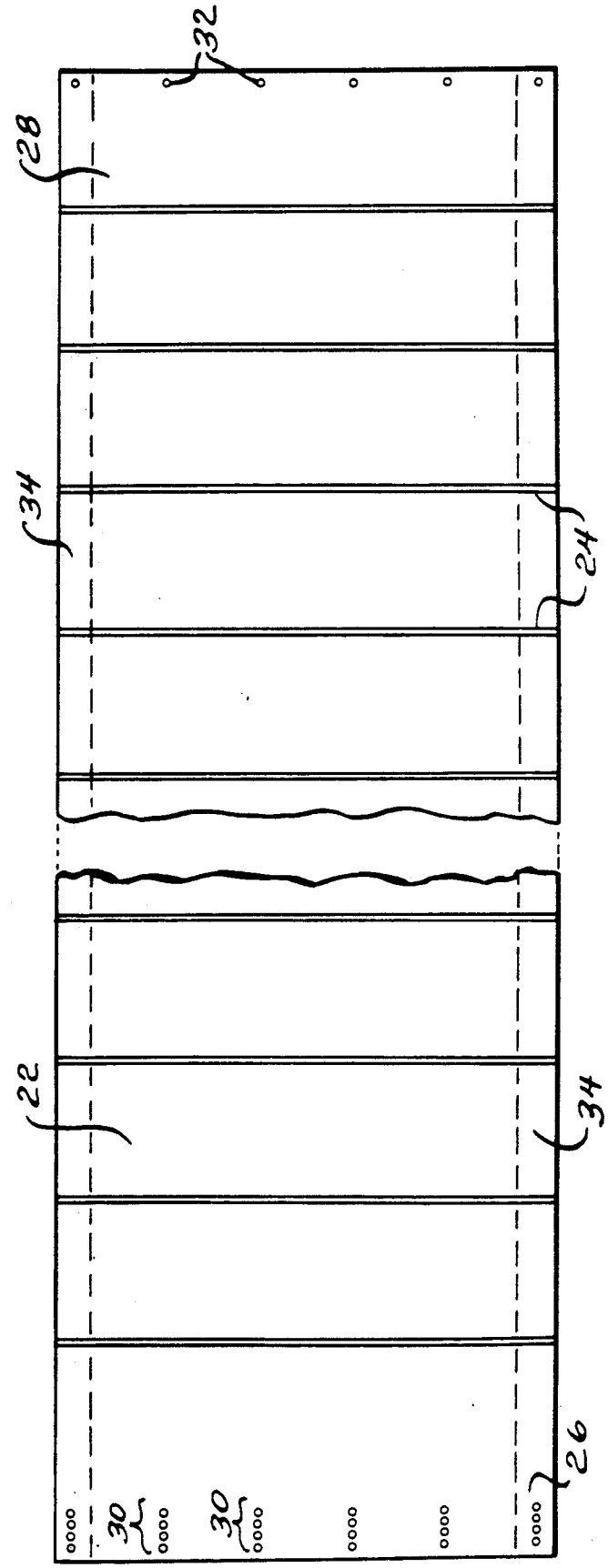

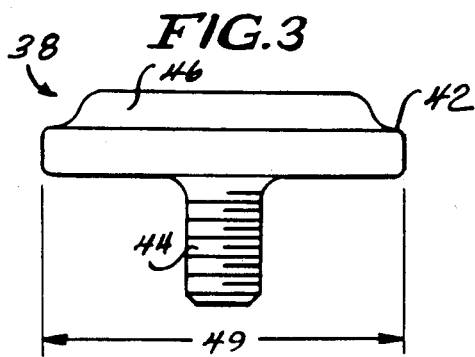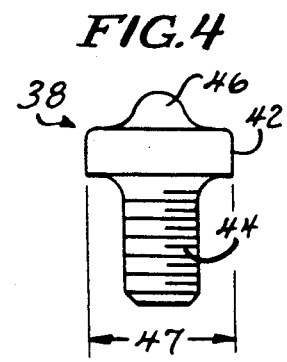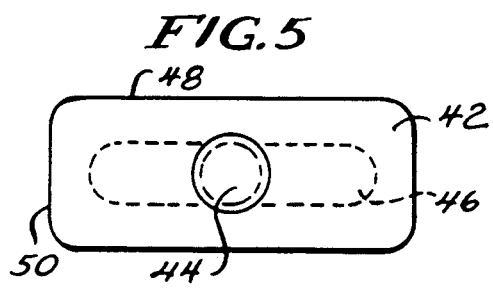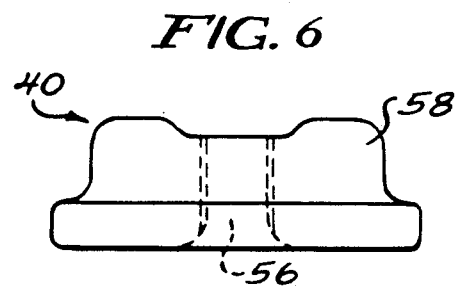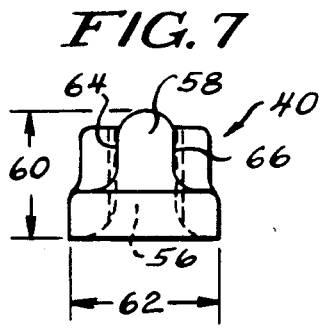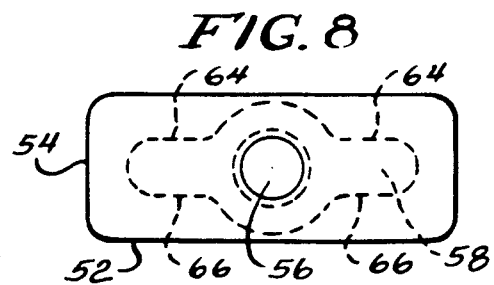

SWATHER BELT CONNECTOR

BACKGROUND OF THE INVENTION

The invention relates to belt connectors and methods for connecting the ends to complete a belt. In particular, the invention relates to a connector for connecting the ends of a swather belt and a method for connecting the ends of a swather belt.

Prior to the present invention, the ends of swather belts have been connected by using two long bars having square cross-section. The belt ends are placed together with inside faces against one another to protrude in an upward manner. One bar is placed on each side of the belt ends to sandwich them together. The bars contain holes which correspond with holes on one end of the belt and grooves on the other end. The end containing the groove is pulled tight relative to the end of the belt containing the holes. The bars are then tightened against each other by screwing nuts on a series of bolts running through both bars and the sandwiched belt ends.

The use of bars and bolts requires that the holes in the bars be aligned with the holes and grooves in the ends of the belt before the bolt can be passed through both bars. The misalignment of one bar would misalign all the holes along the length of the bar. Due to the unscrewing affect of vibrations when the swather belt is in use, lock washers are needed between the nuts and bolts.

The bars and bolts previously used to connect swather belts have small parts which are awkward to handle. Also, tools are needed to tighten or loosen the bolts when connecting or disconnecting the belt connector. Even with the use of tools, damage to the screw heads or bolt threads occuring during use on the swather belt will make disconnection (and later reconnection) difficult.

It is an object of the present invention to provide an improved belt connector.

It is another object of the present invention to provide a swather belt connector needing fewer separate pieces.

It is yet another object of the present invention to provide a swather belt connector which is easier to use than prior swather belt connectors and does not require the use of tools for installation.

It is a further object of the present invention to provide a swather belt connector which does not require a locking nut and is not subject to loosening due to vibrations to the swather belt.

It is yet a further object of the present invention to provide a swather belt utilizing an improved swather belt connector.

It is yet an additional object of the present invention to provide an improved method of connecting the ends of the swather belt.

Other and further objects will become apparent from the following discussion of the invention and its embodiments.

SUMMARY OF THE INVENTION

In accordance with this invention, the ends of a swather belt can be connected utilizing a series of integral studs and integral nuts. The stud has an elongated head with length approximately three times its width and a threaded male portion protruding perpendicular to the head. The nut also is elongated and has length approximately three times its width with a threaded aperature to allow for screwing the nut onto the male portion of the stud.

The elongated proportions of the stud and nut provide for the alignment of the long dimensions of the stud and nut to be parallel to the width of the belt. The tension of the belt against this long side restricts turning of the stud relative to the nut and prevents the unscrewing of the nut from the stud.

A swather belt with a series of apertures through each of its ends can be connected using the inventive stud and nut. The belt ends are first positioned with inside surface of one end against the inside surface of the other end, the aperatures of one end of the belt aligned with the aperatures on the other end of the belt. The studs are then inserted through the aligned aperatures and a nut screwed onto the protruding male portion of the studs on the other side of the two belt ends.

BRIEF DESCRIPTION OF THE DRAWINGS

FIG. 1 is a side elevational view of a swather belt with ends connected by use of the connector of the present invention.

FIG. 2 is a planar view of the top side of a swather belt of the present invention.

FIG. 3 is the front elevational view of the connector stud of the present invention.

FIG. 4 is the side elevational view of the connector stud of the present invention.

FIG. 5 is a bottom view of the connector stud of the present invention.

FIG. 6 is a front elevational view of the connector nut of the present invention.

FIG. 7 is a side elevational view of the connector nut of the present invention.

FIG. 8 is a bottom view of the connector nut of the present invention.

DETAILED DESCRIPTION OF THE INVENTION

The improved swather belt connector and the method of connecting the ends of a swather belt may be understood by reference to the diagrams described above. Referring to FIG. 1, the swather belt having ends connected by the stud and nut of the present invention is generally designated by the numeral 20. Swather belt 22, shown without ends connected in FIG. 2, has flights 24 protruding from one side. The belt 22 has two ends 26 and 28. One end 26 of the belt has six sets of holes 30 spaced along its width. Each set of holes 30 comprises four holes aligned lengthwise along the edge of the belt. The other end 28 of the belt contains six individual holes 32 spaced along the width of that end of the belt. However, there may be as many as 10 sets of holes spaced along its width, and more or less than four holes lengthwise as desired.

The belt preferably has a two-ply fold vulcanized against itself along its widthwise edges 34. This provides reinforcement of the belt and additional strength at the edges where the belt undergoes considerable stress. It should be noted that there are a series of holes 30 and individual hole 32 which pass through this two-ply fold at each of the four corners of the belt. Connectors passing through holes at those corners, as is described below, pass through four plys of belt material. Alternatively, the belt will not have a two-ply fold along its widthwise edge.

The ends 26, 28 of the swather belt are connected by bending the belt about shafts 36 and positioning the ends with the inside surface of one end flush against the inside surface of the other (the inside surface is the surface opposite the surface containing the flights 24). The holes 32 at end 28 are then aligned with the holes 30 at end 26. The belt described herein has a series 30 of four holes allowing four different choices of connections of one end of the belt to the other. This allows for a selective connection in one of four different sets of holes and allows the operator to obtain the desired tightness of the belt around shafts 36. After the holes are aligned, the stud 38 is passed through the holes in both belt ends and connected to the nut 40.

The stud is shown in detail in FIGS. 3-5. The stud has substantially rectangular head 42 with protruding male portion 44 projecting perpendicularly from one side of the head. A raised portion 46 projects from the opposite side of the head 42 having width approximately one-third the width 47 of the head. The raised portion has a bell shape in cross-section and extends almost the entire length 49 of the head. This raised portion allows for the easy grasping of the head with index finger on one side and thumb on the other to effect a twisting motion of the stud or for merely holding the stud against a twisting motion o the associated nut.

The head preferably has substantially rectangular shape in the plane perpendicular to the protruding male portion 44. This rectangular shape includes an edge 48 that is preferably approximately three times the width edge 50. Alternatively, the head can be elongated generally in a half-moon or triangular shape having at least one longitudinal edge. Also, alternatively, the head can have length greater than three times the width and up to six or seven times the width.

The connector nut is shown in detail in FIGS. 6-8. The nut preferably has substantially rectangular cross-section with lengthwise edge 52 approximately three times the widthwise edge 54. The nut 40 has threaded aperature 56 running through the nut perpendicularly to the plane of the substantially rectangular dimension. Alternatively, the nut head can be elongated generally in a half-moon, or triangular shape having at least one longitudinal edge. Also, alternatively, the nut can have length greater than three times the width and up to six or seven times the width.

The nut has butterfly portion 58 protruding from the nut in the direction parallel to the aperature of the nut. The butterfly portion has height approximately two-thirds the height 60 of the entire nut and width approximately one-third the width 62 of the entire nut. The butterfly portion 58 has opposing sides 64, 66 approximately parallel to one another and the aperature 56. These sides 64, 66 allow for easy grasping by a hand, particularly the forefinger and thumb, for turning in order to screw the nut onto the stud, to hold the nut steady against turning of the stud, or to unscrew the nut from the stud.

The ends of the swather belt are connected by passing the male portion 44 of stud 38 through the aligned holes of the two ends 26, 28 of the swather belt. After the stud 38 is inserted through the hole, the nut 40 is mated with the male portion 44 of the stud by screwing it thereon. Preferably, the nut is tightened until it is finger-tight and then backed off slightly until the lengthwise surface 52 of the nut is even with the lengthwise surface 48 of the stud and the plane of a belt. This aligns the length of the nut and the stud with each other in the plane of the belt parallel to the widthwise dimension of the belt. When the nut and stud are oriented this way, turning of the nut relative to the stud is restricted by the pressure of the belt. Accordingly, the connector is not subject to unscrewing by vibrations during normal use of the belt. No lock washer or other device prohibiting rotational movement is needed.

It is preferred that six sets of studs and nuts be utilized to connect the two ends of the belt at six places along its width. However, more connectors or less connectors may be used as required. Of course, more sets of holes may be necessary to facilitate the use of more than six sets of connectors.

When six studs and six nuts are used only a total of twelve pieces are needed to connect the belt ends. This is significantly less then the prior art method which commonly utilizes two bars, eight bolts, eight nuts, and eight lock washers, for a total of twenty-six pieces.

It should be noted that the use of the connector stud 38 and connector nut 40 as taught herein, with the inside of belt edge 26 against belt edge 28, will cause the ends of the belt to stick out in a flight-like manner as shown in FIG. 1. The excess belt material can be left intact, or alternatively, trimmed from the belt by knife, scissors or other means known in the art for cutting belt material. The protruding part of the belt ends held together by the connectors whether trimmed or not, will act as an additional flight for catching and conveying material o the swather belt.

The stud 38 and nut 40 are each integral pieces which preferably are made of a zinc aluminum alloy, but alternatively could be made of hard plastic material. Of course, they also could be produced from any other appropriate material known in the art having the desired strength and other characteristics.

From the above description it will be apparent that there is provided an improved swather belt connector, swather belt with improved connector, and method of connecting the ends of the swather belt having advantages described above, but which obviously are susceptible to modification in their form, method, operation, detailed construction and arrangement without departing from the principles involved. It is to be understood that the invention is not limited to the specific features shown, but that the means, method and construction herein disclosed comprise the preferred form of several modes of putting the invention into effect. The invention is, therefore, claimed in any of its forms or modifications within the legitimate and valid scope of the appended claims.

What is claimed is:

1. A belt connector for holding the inside surface of one end of a belt against the inside surface of the other end, the connector comprising:

an integral stud having elongated head with length at least approximately three times its width and threaded male portion protruding perpendicularly to the head; and an elongated integral nut having length at least approximately three times its width and a threaded aperture proportioned to receive the protruding male portion, the aperture extending perpendicular to the length of the nut;

wherein the stud further comprises a raised portion on the head opposite the male portion, the raised portion being centrally located with respect to the width of the head and extending the majority of the length of the head.

2. A belt connector comprising:

a stud having substantially rectangular head with length approximately three times its width and threaded male portion protruding perpendicularly to the head, a raised portion on the head opposite the male portion, the raised portion being centrally located with respect to the width of the head and extending the majority of the length of the head;

a substantially rectangular nut having length approximately three times its width and a threaded aperature proportioned to receive the protruding male portion, the nut having a butterfly portion protruding from one side, the butterfly portion extending parallel to the aperature approximately two-thirds the height of the nut and extending the majority of the length of the nut, the butterfly portion having opposing parallel sides extending in a direction parallel to the aperature, and the butterfly portion having width approximately one-third the width of the nut.

3. A swather belt comprising:

a substantially rectangular belt having interspersed flights and two ends, each end having a plurality of aperatures therethrough, the apertures on each end corresponding to the aperatures on the other end when the ends are positioned facing one another;

a unitary stud having elongated head with length at least approximately three times its width and threaded male portion protruding perpendicularly to the head, the stud having a raised portion on the head opposite the male portion, the raised portion being centrally located with respect to the width of the head and extending the majority of the length of the head, the male portion passing through the two belt ends; and an elongated nut having length at least approximately three times its width and a threaded aperature proportioned to receive the protruding male portion, the aperature extending perpendicular to the length of the nut, the nut mated on the end of the male portion of the stud.

4. The swather belt of claim 3 wherein the stud head is substantially rectangular.

5. The swather belt of claim 4 wherein the nut is substantially rectangular.

6. A swather belt comprising:

a substantially rectangular belt having interspersed flights and two ends, each end having a plurality of aperatures therethrough, the aperatures on each end corresponding to the aperatures on the other end when the ends are positioned facing one another;

a stud having elongated head with length at least approximately three times its width and threaded male portion protruding perpendicularly to the head, the male portion passing through the two belt ends; and an elongated nut having length at least approximately three times its width and a threaded aperature proportioned to receive the protruding male portion, the aperature extending perpendicular to the length of the nut, the nut mated on the end of the male portion of the stud;

wherein the stud further comprises a raised portion on the head opposite the male portion, the raised portion being centrally located with respect to the width of the head and extending the majority of the length of the head.

7. The belt connector of claim 6 wherein the nut has butterfly portion protruding from one side, the butterfly portion extending parallel to the aperature.

8. The swather belt of claim 7 wherein the butterfly portion extends about two-thirds the height of the nut.

9. The swather belt of claim 8 wherein the butterfly portion extends the majority of the length of the nut.

10. The swather belt of claim 9 wherein the butterfly portion has opposing parallel sides which extend in a direction parallel to the aperature.

11. The swather belt of claim 10 wherein the butterfly portion has width approximately one-third the width of the nut.

* * * * *